(12) United States Patent
Ludescher et al.

(10) Patent No.: US 11,820,602 B2
(45) Date of Patent: Nov. 21, 2023

(54) VIBRATION CONVEYOR AND METHOD FOR REGULATING A VIBRATION DRIVE OF A VIBRATION CONVEYOR

(71) Applicant: K-TRON Technologies, Inc., Sewell, NJ (US)

(72) Inventors: Stefan Ludescher, Steisslingen (CH); Helfenstein Urs, Buchs (CH)

(73) Assignee: K-TRON TECHNOLOGIES, INC., Sewell, NJ (US)

(*) Notice: Subject to any disclaimer, the term of this patent is extended or adjusted under 35 U.S.C. 154(b) by 336 days.

(21) Appl. No.: 16/348,817

(22) PCT Filed: Oct. 9, 2017

(86) PCT No.: PCT/IB2017/056229
§ 371 (c)(1),
(2) Date: Jul. 6, 2021

(87) PCT Pub. No.: WO2018/069819
PCT Pub. Date: Apr. 19, 2018

(65) Prior Publication Data
US 2023/0049805 A1 Feb. 16, 2023

(30) Foreign Application Priority Data
Oct. 14, 2016 (CH) ........................ 1376/16

(51) Int. Cl.
*B65G 27/32* (2006.01)
*B65G 27/24* (2006.01)
*B65G 27/26* (2006.01)

(52) U.S. Cl.
CPC ............ *B65G 27/32* (2013.01); *B65G 27/24* (2013.01); *B65G 27/26* (2013.01); *B65G 2203/0266* (2013.01); *B65G 2203/042* (2013.01)

(58) Field of Classification Search
None
See application file for complete search history.

(56) References Cited

U.S. PATENT DOCUMENTS

| 2,968,424 A | * | 1/1961 | Lawson | B65G 27/00 222/161 |
| 4,331,263 A | * | 5/1982 | Brown | B65G 27/32 318/132 |

(Continued)

FOREIGN PATENT DOCUMENTS

| DE | 102015102384 A1 | * | 8/2016 | ............ B65G 27/32 |
| EP | 0548812 B1 | * | 12/1992 | |

(Continued)

OTHER PUBLICATIONS

PCT/IB2017/056339 Written Opinion dated Dec. 8, 2017.

(Continued)

*Primary Examiner* — Joseph A Dillon, Jr.
(74) *Attorney, Agent, or Firm* — Dinsmore & Shohl LLP

(57) ABSTRACT

The vibration feeder has a drive unit comprising a vibration drive, a carrier arrangement comprising a feeding element for the material to be conveyed and a control for the vibration drive, wherein an acceleration sensor is arranged on the drive unit, which when the vibration feeder is operating, detects the actual acceleration of the drive unit, and wherein the control is configured to use the actual acceleration signal of the acceleration sensor for generating a regulating variable for the vibration drive such that the carrier arrangement vibrates essentially within its resonance frequency ($f_{res}$). This makes it possible, during operation, to detect the acceleration of a drive unit of the vibration feeder and to generate therefrom a regulating variable for a vibration drive such that a carrier arrangement of the vibration feeder vibrates closer to its resonance frequency ($f_{res}$) or is brought back again to the same. In addition the inventive (Continued)

Figure 1:
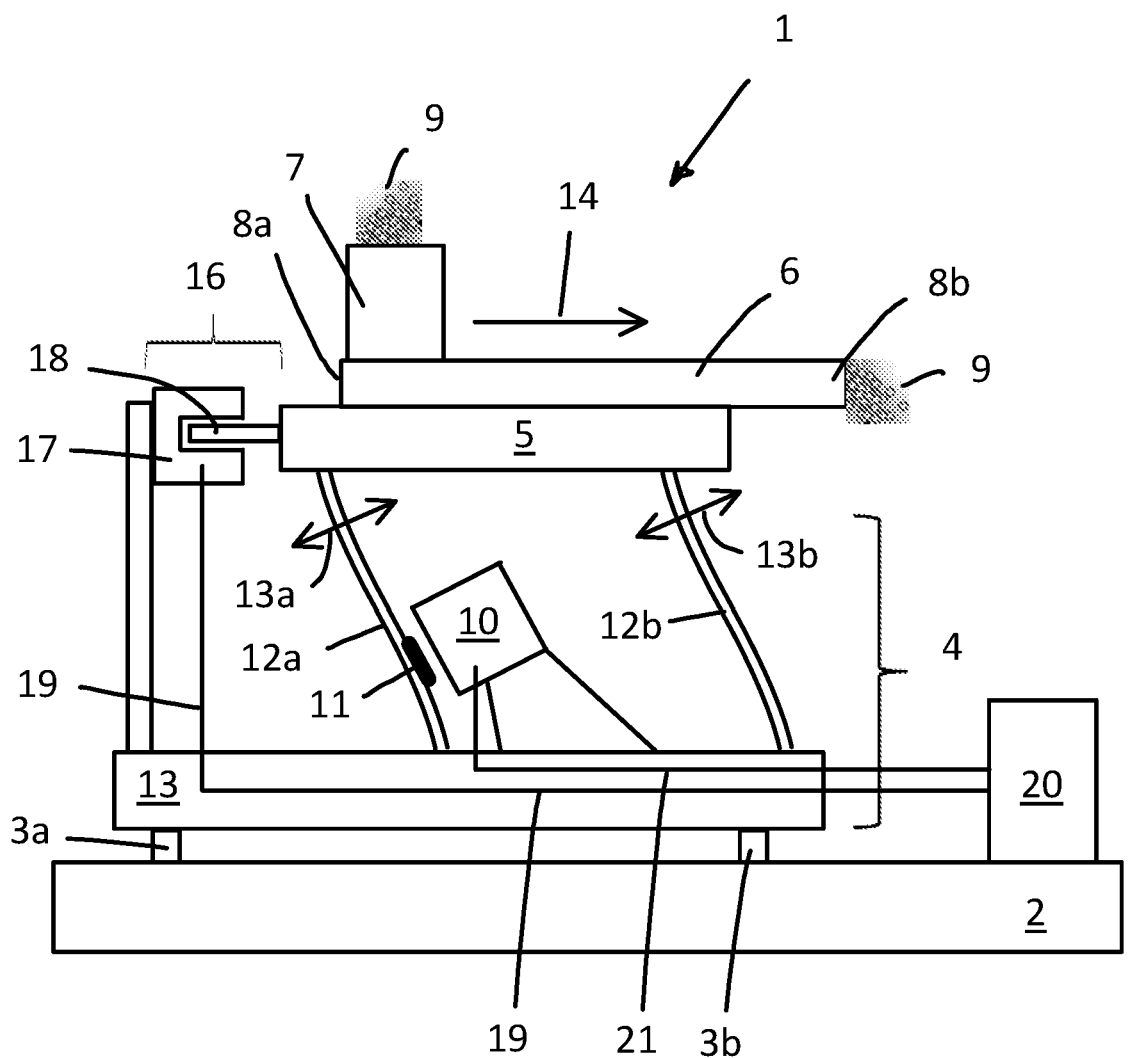

control may be used to also regulate the amplitude of the carrier arrangement and the associated mass flow m to a required value.

12 Claims, 4 Drawing Sheets

(56) References Cited

U.S. PATENT DOCUMENTS

| | | | | |
|---|---|---|---|---|
| 4,405,043 A * | 9/1983 | Burghart | ................ | B65G 27/30 335/265 |
| 4,544,280 A * | 10/1985 | Mitsukawa | ............. | B29B 7/603 366/18 |
| 4,677,353 A * | 6/1987 | Shieh | ..................... | G05D 19/02 318/128 |
| 4,843,579 A * | 6/1989 | Andrews | ................ | G01G 13/04 222/196 |
| 4,913,281 A * | 4/1990 | Muller | .................. | B65G 27/08 267/260 |
| 4,954,975 A * | 9/1990 | Kalata | .................... | G01G 11/08 702/179 |
| 5,074,403 A * | 12/1991 | Myhre | .................. | B65G 27/32 198/769 |
| 5,080,218 A * | 1/1992 | Izume | ............... | H02M 7/53803 198/762 |
| 5,081,600 A * | 1/1992 | Tump | ................... | G05D 7/0611 177/105 |
| 5,103,401 A * | 4/1992 | Johnson | ................ | G01G 13/29 177/105 |
| 5,132,897 A * | 7/1992 | Allenberg | ............ | G01G 11/086 702/179 |
| 5,149,080 A * | 9/1992 | Yamamoto | ............. | B65H 5/008 271/193 |
| 5,158,170 A * | 10/1992 | Grengg | .................. | B65G 27/32 198/762 |
| 5,260,880 A * | 11/1993 | Tump | ................... | G01G 11/086 177/105 |
| 5,341,307 A * | 8/1994 | Myhre | ................. | G05D 7/0605 177/105 |
| 5,777,232 A * | 7/1998 | Kurita | .................... | G05D 19/02 73/664 |
| 5,804,733 A * | 9/1998 | Kurita | ...................... | B06B 3/00 198/756 |
| 5,859,780 A * | 1/1999 | Pearson | .................. | B65G 43/00 700/240 |
| 6,119,047 A * | 9/2000 | Eryurek | ............. | G05B 23/0221 714/38.14 |
| 6,168,305 B1 * | 1/2001 | Marmsater | ........... | G01G 11/086 222/77 |
| 6,229,898 B1 * | 5/2001 | Goodman | .............. | G05D 19/02 381/71.4 |
| 6,811,301 B2 * | 11/2004 | Packard | .................. | B29B 7/603 700/240 |
| 6,868,960 B2 * | 3/2005 | Jones | ..................... | B65G 27/20 198/767 |
| 7,185,756 B2 * | 3/2007 | Matsumoto | .............. | B26D 7/18 198/759 |
| 7,222,750 B2 * | 5/2007 | Mosca | ................... | G01G 13/28 198/758 |
| 7,392,897 B2 * | 7/2008 | Krell | ....................... | B65G 27/30 198/760 |
| 7,965,001 B2 * | 6/2011 | Aoyama | ................ | B65G 27/32 310/36 |
| 8,200,367 B2 * | 6/2012 | Foley | ................... | G01G 13/003 700/240 |
| 8,452,446 B1 * | 5/2013 | Madris | .................. | A61J 7/0084 221/133 |
| 8,710,379 B2 * | 4/2014 | Ahmed | ................ | G01G 11/003 177/116 |
| 9,057,640 B1 * | 6/2015 | Kreutzer | ................. | C04B 14/30 |
| 9,206,081 B2 * | 12/2015 | Kreutzer | ............. | C04B 14/30 |
| 9,452,890 B2 * | 9/2016 | Spaulding | ............. | B65G 27/04 |
| 9,790,117 B2 * | 10/2017 | Ahrens | ................... | C03B 5/245 |
| 9,833,784 B2 * | 12/2017 | Wong | ..................... | C12M 99/00 |
| 10,071,865 B2 * | 9/2018 | Maggioni | ............. | B65G 27/24 |
| 10,119,853 B2 * | 11/2018 | Brandt, Jr. | ............. | G01G 13/28 |
| 10,180,345 B2 * | 1/2019 | Margalit | .............. | G01G 13/026 |
| 10,563,966 B2 * | 2/2020 | Haberman | .......... | F42B 33/0285 |
| 10,632,482 B2 * | 4/2020 | Fushimi | ................... | B05B 7/12 |
| 10,815,064 B1 * | 10/2020 | Ahmed | ................. | B65G 27/04 |
| 10,961,058 B2 * | 3/2021 | Helfenstein | ............ | B65G 27/32 |
| 10,974,359 B2 * | 4/2021 | Sekiya | ............. | H01L 21/67715 |
| 11,198,563 B2 * | 12/2021 | Helfenstein | ............ | B65G 27/30 |
| 11,207,859 B2 * | 12/2021 | Shimada | ............. | B01F 33/8051 |
| 11,358,801 B2 * | 6/2022 | Svejkovsky | ........... | B65G 27/16 |
| 2020/0317452 A1 * | 10/2020 | Savoie-Lavigueur | ........................ | B65G 27/08 |
| 2021/0016973 A1 * | 1/2021 | Helfenstein | ............ | B65G 43/00 |
| 2022/0073282 A1 * | 3/2022 | Mesan | ................... | B65G 27/12 |
| 2022/0112032 A1 * | 4/2022 | Jensen | ................. | H02P 25/032 |

FOREIGN PATENT DOCUMENTS

| | | | | |
|---|---|---|---|---|
| JP | S58193814 A | | 11/1983 | |
| JP | 62100311 A | * | 5/1987 | |
| JP | H04182210 A | | 6/1992 | |
| JP | 2879267 B2 | | 4/1999 | |
| JP | 2000033913 A | | 2/2000 | |
| JP | 2010120769 A | | 6/2010 | |
| JP | 2013095563 A | | 5/2013 | |
| JP | 2013227112 A | | 11/2013 | |
| WO | WO-2010091526 A1 | * | 8/2010 | ............... A61J 3/10 |
| WO | WO-2019017581 A1 | * | 1/2019 | ............... B06B 1/06 |

OTHER PUBLICATIONS

Feeding Concepts: "Variable Frequency Controllers | Feeding Concepts Inc.", feedingconcepts.com, May 30, 2016 (May 30, 2016), https://feedingconcepts.com/yariable-frequency-controllers-vfs/.

* cited by examiner

VIBRATION CONVEYOR AND METHOD FOR REGULATING A VIBRATION DRIVE OF A VIBRATION CONVEYOR

The present invention relates to a method for regulating the vibratory movement of a vibration feeder according to the preamble of claim 1 and a vibration feeder according to the preamble of claim 6.

Vibration feeders of this kind are used in many sectors of industry, for all sorts of materials, insofar as these can be at all conveyed by a vibration feeder. The bulk materials are placed on a feeding element, usually a feeder tray, which then performs a cyclical forward/upward movement with a corresponding return—the vibration—whereby individual particles of the material are thrown forward and simultaneously slightly upward at a throwing angle. The feeding element performs the return before the particles which are falling back come to rest again on it, so that, as the next forward/upward movement is carried out, the particles are conveyed one step further.

Vibration feeders accordingly comprise a vibrating carrier arrangement for the exchangeable feeding element lying thereon and designed in accordance with the material and other criteria, wherein the carrier arrangement is made to vibrate as desired by a drive unit. Due to the vibratory movement the drive unit of the vibration feeder also vibrates (reaction forces), which is permitted due to the drive unit being mounted on the base, because otherwise considerable noise would be generated and adjacent machines and plants could be affected.

In particular vibration feeders used in production lines have to meet stringent requirements in a number of respects. This relates, among others, to the protection against explosion (e.g. in Europe according to the ATEX guidelines of the EU) and electromagnetic compatibility (e.g. in Europe according to the EMV-guideline of the EU). Explosion protection and electromagnetic compatibility often lead to considerable expenditure, because the controller or control for the vibration feeder is often incorporated in the central control of the production line, and as a result may be remote from the vibration feeder by as much as 300 m, which means that respective cable connections are necessary, which require an expensive design in respect of explosion protection and electromagnetic compatibility. Since the vibration feeder, as a rule, comprises a vibration drive functioning in a magnetic manner and often also an electromagnetic path detector for the vibrating feeder for regulating the amount being conveyed or the mass flow $\dot{m}$ flowing through the feeding element of the vibration feeder, explosion protection and electromagnetic compatibility are a topic not be underestimated including as regards the construction of the vibration feeder itself.

Therefore it is the object of the present invention to improve a vibration feeder of the kind mentioned.

To this end a vibration feeder according to the characterising features of claim 1 is operated, wherein a vibration feeder configured according to the invention comprises the characterising features of claim 6.

Due to the fact that the acceleration of the drive unit is used as a regulating variable for the vibration drive, regulation can be carried out with a simple sensor for which explosion protection and electromagnetic compatibility are not relevant. Due to the fact that the acceleration sensor is arranged on the carrier arrangement, i.e. on the vibration feeder itself, explosion protection and electromagnetic compatibility can be ensured locally on the vibration feeder itself at a small amount of expense. In addition to the cited requirement there is no need for a comparatively expensive sensor for the vibratory movement of the carrier arrangement. Furthermore, independently of the above-mentioned advantages, an improved, particularly precise regulation of the mass flow this obtained due to the detection of the acceleration of the carrier arrangement.

Further preferred embodiments comprise the features of the dependent claims.

Figure 2:
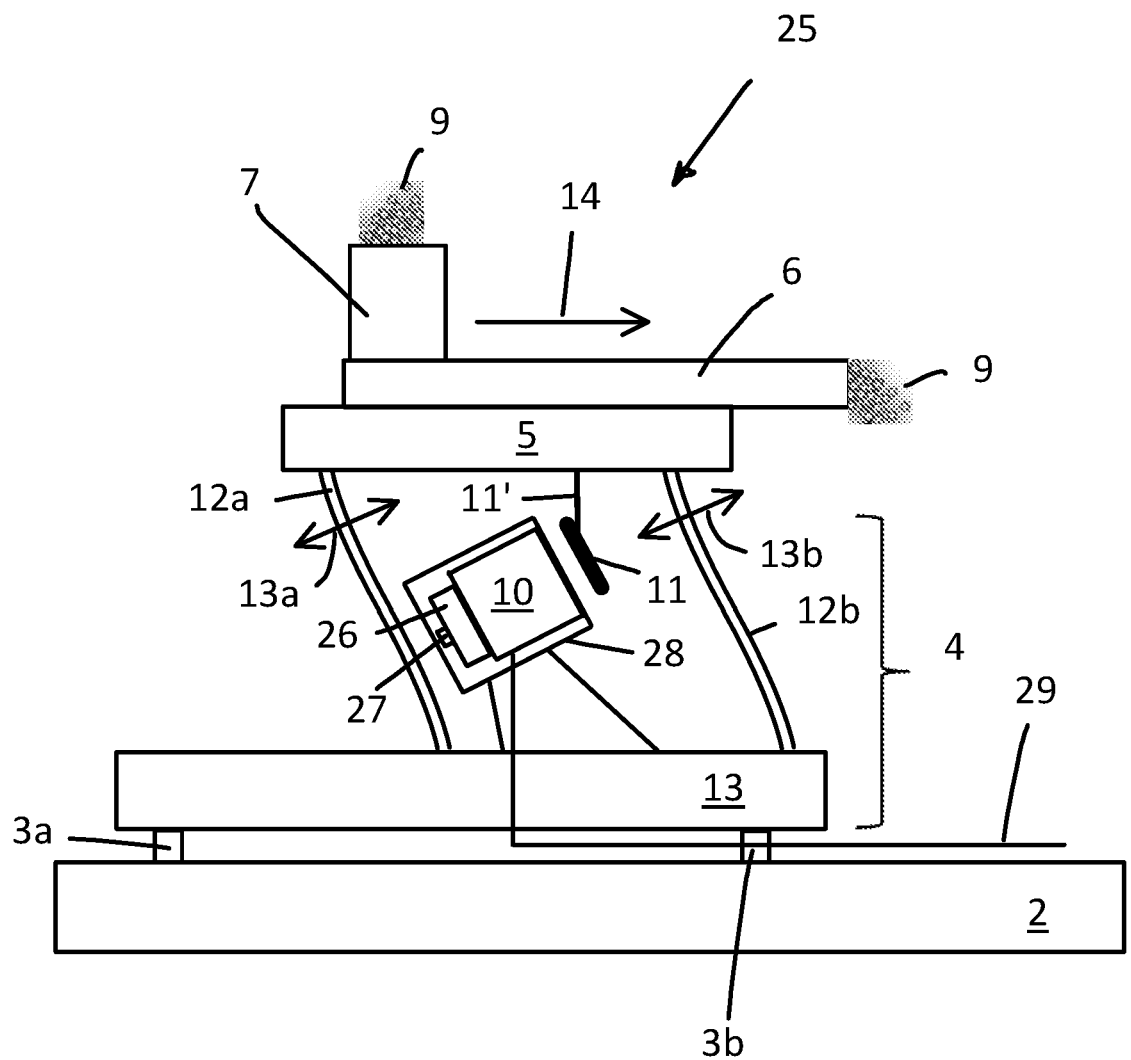
Figure 3:
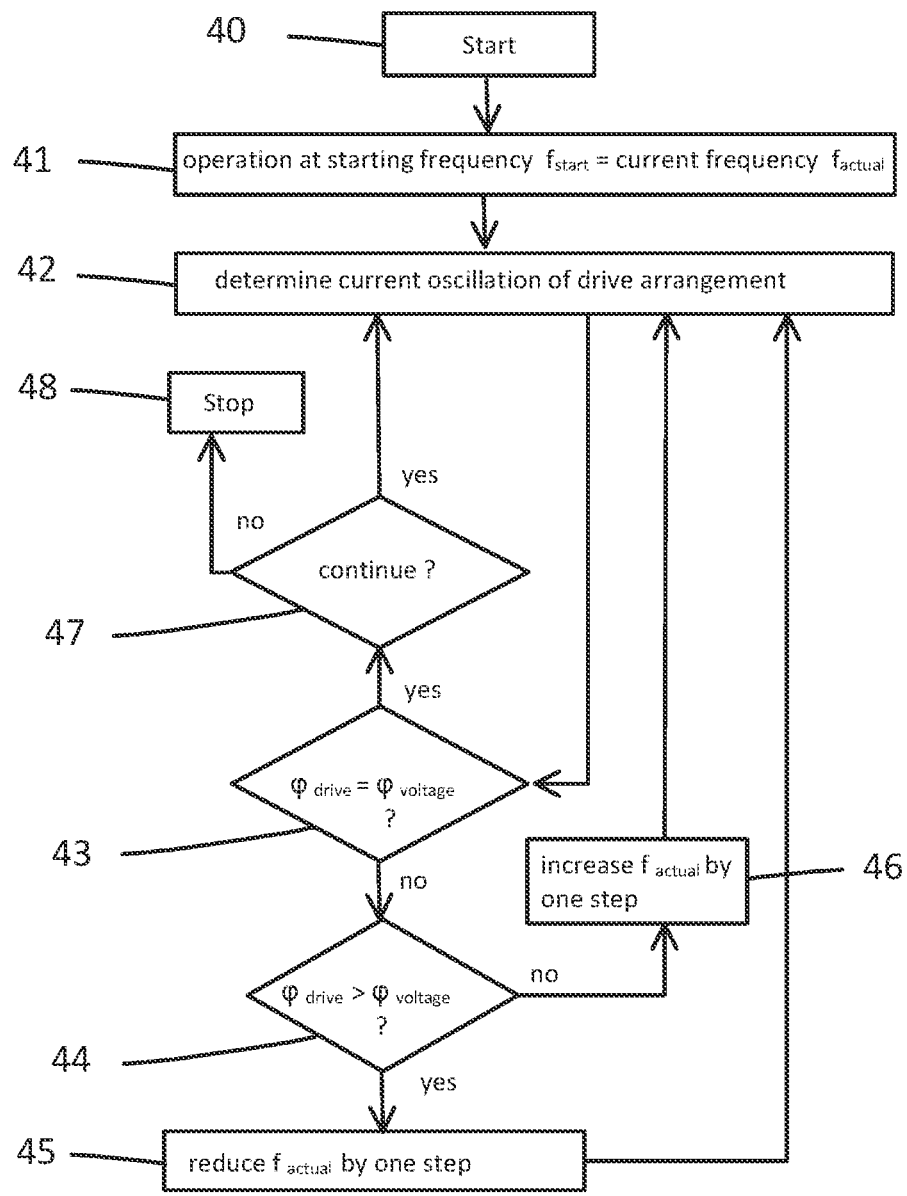
Figure 4:
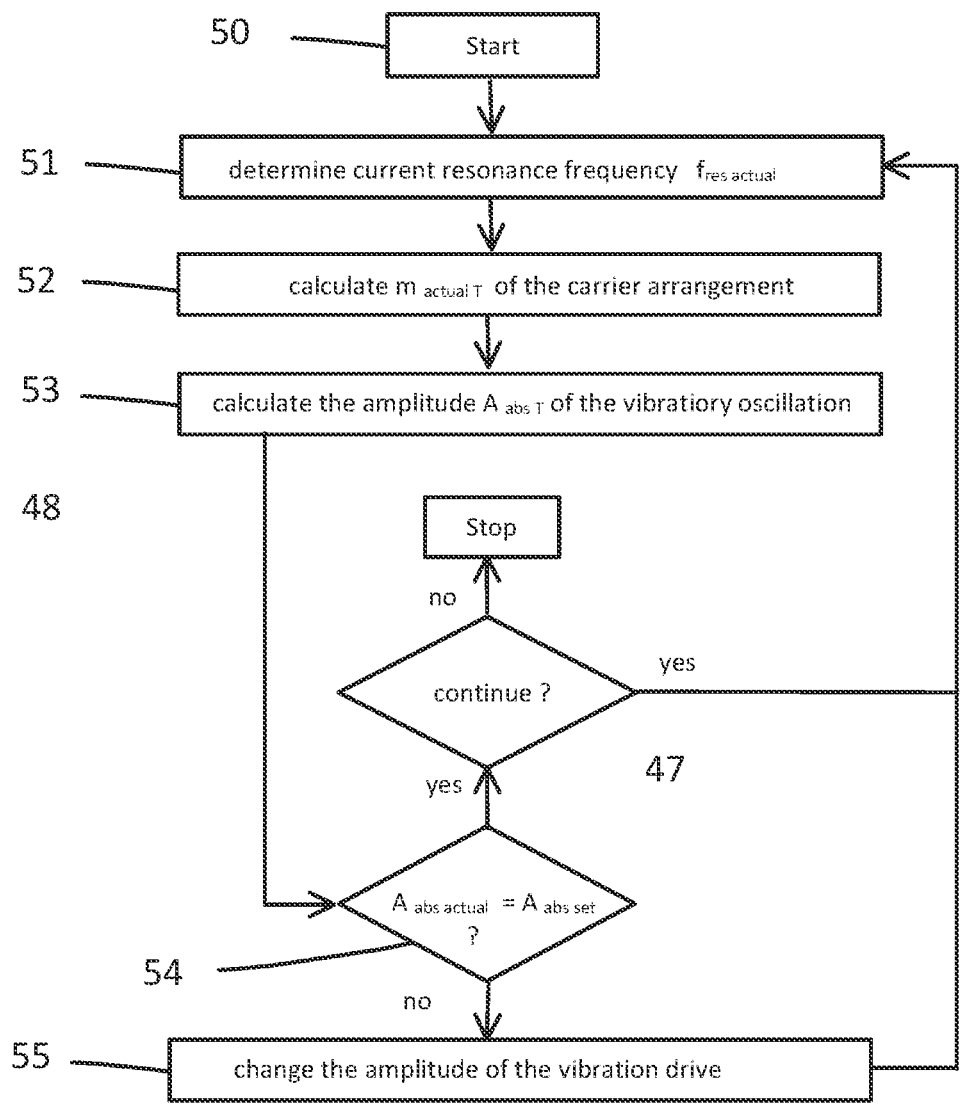

The invention will now be explained in detail with reference to the figures. Identical items are marked in principle with identical reference symbols in the figures, in which:

FIG. 1 shows a schematic view of a vibration feeder according to the state of the art, FIG. 2 shows a schematic view of a preferred embodiment of a vibration feeder according to the invention, FIG. 3 shows a flow diagram for a first regulating cycle according to the present invention, and FIG. 4 shows a flow diagram for a second regulating cycle according to the present invention.

FIG. 1 schematically, as an example, shows a vibration feeder 1 according to the state of the art, which is mounted on the base 2 via a bearing arrangement, in this case elastic feet or supports 3a, 3b. Visible are: a drive unit 4 for a carrier arrangement 5, which in turn has a feeding element configured here as a feeder tray 6 arranged on it, which is loaded via a filling channel 7 at its rear end 8a with bulk material 9 (e.g. cereals, pharmaceutical products, plastic granulates and powders of all kinds or metallic materials of all kinds, etc.). Due to the vibratory movement of the carrier arrangement 5 the feeder tray 6 also vibrates, so that the bulk material 9 is discharged from the vibration feeder 1 at the front end 8b of the feeder tray 6.

The drive unit 4 comprises a vibration drive 10, which in the embodiment shown is configured as a coil carrying alternating actual, which in operation forms a periodic magnetic field and thus acts on a magnet 11, which in turn is arranged on a leaf spring 12a. The leaf springs 12a and 12b form drive levers for the carrier arrangement 5, are slightly inclined in view of the throwing angle and are set into a vibratory motion indicated by the double arrows 13a,b, so that the carrier arrangement 5 due to the cyclic parallel shift in relation to a base plate 13 of the drive unit 4 executes a vibratory oscillation, which generates the mass flow $\dot{m}$ of the conveyed material or bulk material 9 in feeding feeder direction 14.

Another item shown in the figure is a sensor 16 for an amplitude of the vibratory oscillation of the carrier arrangement 4, which is a measure for the mass flow $\dot{m}$ of bulk material 9 generated by the vibratory oscillation. The sensor 16 comprises a coil arrangement 17 fixed to the drive unit 4, wherein a magnetic bar 18 provided on the carrier arrangement 5 protrudes into the opening of the coil arrangement, wherein in operation of the vibration feeder 1 the vibratory oscillation of the magnetic bar 18 induces a voltage in the coil arrangement 17, which can be utilised to calculate in the known manner, the path or the actual location of the carrier arrangement 5.

Via a line 19 the shift of the carrier arrangement 5 detected in the sensor is communicated to a control 20 arranged on the base 2, the control supplying the vibration drive 10 with alternating actual via a feed line 21 such that the actual vibratory oscillation of the carrier arrangement 5 is kept as far as possible within the range of the individual values set for the respective feeding operation. It is preferred if the vibration drive 10, the sensor 16 and the lines 19, 20 are shielded so as to be explosion-proof and electromagnetically compatible and the control 20 is provided at the same location as the line control.

If the drive unit 4 is not rigidly fixed to the base 2 (which as the rule is the case as mentioned above), it also vibrates due to the reaction forces of the driven carrier arrangement 5 and in the opposite sense to these. The sensor thus detects only the relative shift between the drive unit 4 and the carrier arrangement 5, but not the shift crucial for the mass flow ṁ in relation to the base 2. Therefore an estimated correction factor must be used for the vibratory oscillation of the carrier arrangement 5 detected in operation, as a result of which regulation of the mass flow ṁ can only be an approximate, even if the mass m A of the drive unit 4 is kept large compared to that of the carrier arrangement 5, for example by a weight, so that the resulting amplitude of the (counter) oscillation of the drive unit 4 is comparatively small.

The construction described above with reference to FIG. 1 is known in principle to the expert, including variants.

In summary FIG. 1 shows a vibration feeder 1 with a drive unit 4 comprising a vibration drive 10, a carrier arrangement 5 comprising a feeding element 6 for the material 9 to be conveyed, and with an external control 20 for the vibration drive 10.

As mentioned in the beginning vibration feeders of this kind have the disadvantage that to regulate them is expensive, on the one hand due to the necessity of a precise regulation of the mass flow ṁ itself by detecting the true shift of the carrier arrangement 5, and on the other, due to the expenditure for explosion protection and electromagnetic compatibility, in particular in view of the necessary cabling to the control 20.

FIG. 2 schematically shows a vibration feeder 25 according to the invention, where the control 26 for the vibration feeder 25 is attached to its vibration drive 10, wherein the control 26 is equipped with an acceleration sensor 27. Also shown is an encapsulation 28 for the purpose of explosion protection and electromagnetic compatibility, which encloses the vibration drive 10, the control 26 and the acceleration sensor 27. The vibration drive 10 is provided with a feed line 29 to an external voltage source not shown in the figure for reasons of clarity.

Preferably the acceleration sensor 27 is firmly attached to the control 26, which is turn is fixed to the vibration drive 10, which for its part is rigidly connected to a base plate 13 (or simply to the drive unit 4).

When in operation the vibration drive 10 generates a drive oscillation (with the drive frequency) of the carrier arrangement 5. In the embodiment shown in the figure the magnet 11 is arranged directly on the carrier arrangement 5 via a schematically drawn holder 11', wherein then as now the relative movement between the carrier arrangement 5 and the drive unit 4 is determined by the spring-elastic leaf springs 12a, 12b.

The carrier arrangement 5 thus performs the vibratory oscillation with an amplitude $A_T$ of the vibratory movement, which generates the mass flow m. The reaction forces of the carrier arrangement 5 resulting from the vibratory oscillation in turn generate the oscillation of the drive unit 4, i.e. the oscillation which the drive unit 4 performs due to the reaction forces acting on it. The oscillation of the drive unit 4 has the same frequency as the vibratory oscillation, but a different amplitude $A_A$.

The acceleration sensor 27 now detects the oscillation of the drive unit 4 and sends to the control 26, preferably continuously, a respective (actual) acceleration signal. This is processed by the control 26 for a real-time activation of the vibration drive 10, i.e. the control 26 generates a regulating variable S for the vibration drive 10, wherein the control 26 is further configured to activate the vibration drive 10 via the regulating variable S such that the carrier arrangement 5 oscillates or vibrates within its resonance frequency $f_{res}$.

The result is that an acceleration sensor 27 is arranged on the drive unit 4, so that, when the vibration feeder 25 is in operation, the acceleration sensor 27 detects the actual acceleration of the drive unit 4, and the control 26 is configured, using a actual acceleration signal of the acceleration sensor 27, to generate a regulating variable S for the vibration drive 10 such that the carrier arrangement 5 vibrates essentially within its resonance frequency $f_{res}$.

In the embodiment shown the drive unit 4 comprises spring-elastically configured drive levers for the carrier arrangement 5, via which this is mounted on the drive unit 4. Preferably the drive levers are configured as leaf springs 12a, 12b.

If, as shown in FIG. 2, in a preferred embodiment the control 26 is arranged on the drive unit 4 and the acceleration sensor 27 is arranged on the control 26, a compact arrangement is advantageously created, which can be disposed at a suitable location on the drive unit 4, especially preferably in the encapsulation 28 for the vibration drive 10 (or its coil), wherein then most preferably the encapsulation 28 is effective as regards explosion suppression and is shielded with respect to electromagnetic compatibility. This is supported by the fact that due to the inventive control 26, which has the acceleration sensor 27 arranged on it, the vibration feeder 25 can be operated with a supply voltage of 48V and an amperage of 1 A.

With an embodiment according to the invention not shown in the figures, a vibration drive is provided on more than one drive lever. In addition it is also part of the invention if the vibration drives act in different ways, e.g. in only one direction and then in the opposite direction at any one time. With arrangements of this kind a feeding output up to approx. 5000 kg/h can be achieved, with power consumption being 4 watt.

FIG. 3 shows a flow diagram of a first regulating cycle of the control 26, in order to operate the loaded carrier arrangement 5 complete with its filled feeder tray 6 within the range of its resonance frequency $f_{res}$, with the aid of the vibration drive 10 as specified by the invention. In operation energy consumption of the vibration arrangement 10 is minimal in (or within the range of) the resonance frequency $f_{res}$, i.e. the efficiency of the vibration feeder 25 is at its maximum. The resonance frequency $f_{res}$ of the carrier arrangement 5 is dependent, among others, on its actual mass $m_{ist\ T}$, i.e. the feeding element selected in operation for the actual feeding requirement (design of the feeder tray 6) and the filling with bulk material 9 because for a number of reasons the filling, during the feeding process, does not remain reliably stable, but may continuously change to a certain extent.

The first regulating cycle starts with step 40, when the vibration feeder is switched on, i.e. is switched into an "operation in the range of the resonance frequency" mode. In the following step 41 the control 26 loads from an associated memory a predetermined value for a drive frequency of the vibration drive 10, here a start frequency $f_{start}$, which is chosen such that the resulting vibratory oscillation of the carrier arrangement 5 lies as close as possible to its resonance frequency $f_{res}$. Accordingly the control 26 applies a respective alternating voltage with the start frequency $f_{start}$ to the vibration drive 10. (The start frequency $f_{start}$ is of course also a actual frequency $f_{ist}$ of the alternating voltage applied to the vibration drive 10.) The expert can program the start frequency $f_{start}$ to be a fixed value, e.g. by way of an assumed average mass of the carrier arrangement 5 (the mass of the drive unit 4 is known), or alternatively this can be entered by the operator prior to the start, e.g. in dependence of the currently used feeder try 6 (FIG. 2).

In step 42 the control 26 determines the actual vibration of the drive unit 4 from the acceleration signal of the acceleration sensor 27.

In step 43 the control 26 compares the phase $\varphi_{Antrieb}$ of the actual vibration unit 4 with the phase $\varphi_{Spannung}$ of the alternating voltage applied to the vibration drive 10. If the actual vibration of the drive unit 4 and the actual alternating voltage are not in phase, the carrier arrangement 5 is operated outside its resonance frequency (see description below), whereupon it is determined in step 44, whether the alternating voltage of the oscillation of the drive unit is leading ($\varphi_{Antrieb} > \varphi_{Spannung}$) or trailing ($\varphi_{Antrieb} < \varphi_{Spannung}$).

If $\varphi_{Antrieb} > \varphi_{Spannung}$, the process jumps to step 45, where the actual drive frequency, here the frequency of the alternating voltage $f_{ist}$ applied to the vibration drive 10 is reduced by one step (see description below). The size of the step is determined by the expert in the actual case, and among others depends on the used regulating model of the vibration feeder. Alternatively it can be input by operating personnel.

If $\varphi_{Antrieb} < \varphi_{Spannung}$, the process jumps to step 46, where the actual drive frequency, i.e. here the frequency of the alternating voltage $f_{ist}$ applied to the vibration drive 10 is increased by one step. The size of the step is again determined by the expert in the actual case, or may be input by operating personnel.

The frequency altered in steps 45, 46 is a new actual drive frequency $f_{ist}$, so that after jumping back to step 42 the correspondingly new actual oscillation of the drive unit 4 can be determined from the acceleration signal of the acceleration sensor.

When performing steps 42 to 46, while the vibration feeder is in operation, a phase shift $\Delta \varphi$ is always iteratively reduced between $\varphi_{Antrieb} - \varphi_{Spannung}$, until in step 43 the process jumps to step 47, after which the first regulating cycle is continued or aborted (stop in step 48).

The above-described process is based on the model that the vibration drive 10, due to a harmonious alternating voltage, generates a harmonious vibratory oscillation of the carrier arrangement 5, wherein the alternating voltage leads the alternating actual induced in the coil of the vibration drive 10 by 90°. The magnetic field generated by the alternating actual stimulates the vibratory oscillation of the carrier arrangement 5, wherein thus, for a resonance stimulation of the carrier arrangement 5, the alternating actual must be ahead of the vibratory oscillation by 90°, or in case of the alternating voltage, by 180° in total.

Since the drive unit 4 oscillates in the opposite sense, i.e. is shifted by 180° in relation to the carrier arrangement 5, and the above-described phase comparison is carried out with the oscillation of the drive unit 4 (the acceleration sensor is arranged on the same) as described above, it is mandatory that with the assumed harmoniously oscillating two-mass system (drive unit 4 and carrier arrangement 5), the alternating voltage and the oscillation of the drive unit are in phase, in order to stimulate the carrier arrangement in resonance. According to the invention it is assumed that for a fixed drive unit 4 the vibration drive 10 represents an oscillator, which drives the resonator configured as carrier arrangement 5 via the spring-elastic drive levers. Now, if the drive unit 4 oscillates as well and if its phase shift $\varphi$ is taken into account, instead of the vibratory oscillation of the carrier arrangement 5, the oscillation of the drive unit can be used for regulating the resonance frequency $f_{res}$.

With a further embodiment not shown in the figures it is not a harmonious alternating voltage, which is applied to the vibration drive 10, but a random (and periodic) voltage form, which is determined by the expert depending on the actual realisation of the vibration feeder and composed e.g. of square voltage pulses, and which induces an appropriate periodic actual in the coil. Here it is no longer possible to specify the phase shift $\Delta \varphi$ between $\varphi_{Antrieb} - \varphi_{Spannung}$ necessary for resonance stimulation of the carrier arrangement 5 in a general manner, but this must now be determined depending on the voltage form. This can be done by computation or by trial and error: Since energy consumption for a resonance-vibratory oscillation of the carrier arrangement 5 is minimal, the frequency of the chosen voltage form could e.g. be varied, until energy consumption is minimal and the respective phase shift $\Delta \varphi$ for resonance stimulation can be ascertained. Analogously to step 43 of FIG. 2 it would then be determined as to whether the phase shift $\Delta \varphi$ is as required or not, and then, as the case may be, the phase shift would be corrected analogously to steps 44 to 46, or the process would analogously continue with the regulating cycle at step 47. The remaining steps as per FIG. 2 are performed in the same sequence.

It is thus possible with the first regulating cycle to quickly reach the range of the resonance-vibratory oscillation after starting the vibration feeder 25, or to reach it again in case of a drift or a change in feeding speed.

Independently of the actual configuration of the control and the vibration drive an inventive method results, where a regulating variable S is generated from the continuously detected acceleration of the drive unit 5 for the vibration drive (in the above-described embodiment the frequency of the alternating voltage) such that the carrier arrangement 5 of the vibration feeder 25 oscillates closer to its resonance frequency $f_{res}$. (i.e. after each change in the actual frequency $f_{ist}$—here the alternating voltage—as per steps 45 or 46 of FIG. 2) or, after a drift for example, is brought back to the same.

With this method the oscillation of the drive unit is preferably determined from the detected acceleration, and a drive frequency of the vibration drive is continuously changed in direction of a resonance frequency of the carrier arrangement until a drive oscillation of the vibration drive and a vibratory oscillation of the carrier arrangement comprise a phase shift, which leads to resonance stimulation of the carrier arrangement.

At this point it should be noted that the vibratory oscillation can also be generated mechanically, for example by an eccentric. The number of revolutions of the eccentric then corresponds to the drive frequency.

FIG. 4 shows the process for a second regulating cycle according to the present invention, in order, according to the invention, to regulate an absolute amplitude A abs T of the carrier arrangement 5, i.e. its shift relative to the base 2 and not only relative to the drive unit 4.

The following denotations have been used for the variables concerned: "A" stands for drive unit 4, "T" stands for carrier arrangement 5, "abs" for the absolute value of an amplitude (i.e. relative to the base 2 and not relative to a component of the vibration feeder itself), "ist" stands for the actual value during operation of the vibration feeder and "res" stands for resonance.

The second regulating cycle starts with step 50, in order to initiate regulation of the amplitude $A_{abs\ ist\ T}$. To this end the actual mass $\dot{m}_{ist\ T}$ of the carrier arrangement 5 is calculated. This mass changes, as mentioned above, depending on the feeding element or feeder tray 6 used and the bulk material 9 currently present in the feeder tray 6 (FIG. 2).

In step 51 the actual resonance frequency $f_{res\ ist}$ of the carrier arrangement 5 is retrieved, which is known due to the execution the first regulating cycle and is stored in a suitable memory of the control 26 (FIG. 2) (and which depends on the actual mass $m_{ist\ T}$).

In step 52 the mass $m_{ist\ T}$ of the carrier arrangement 5 is then calculated, for example according to the formula $$m_{ist\ T} = \frac{c(-m_A)}{c - (4f_{res\ ist}^2 m_A \pi^2)}$$

wherein $m_A$ known mass of the drive unit 4, $f_{res\ ist}$ the actual resonance frequency of the carrier arrangement 5 (with its actual mass $m_{ist\ T}$) determined by the first regulating cycle, and c the known spring constant of the drive levers or leaf springs 12a, 12b

In step 53 the actual absolute amplitude A abs ist T of the vibratory oscillation of the carrier arrangement 5 is calculated e.g. by the formula $$A_{abs\ ist\ T} = \frac{A_{abs\ ist\ A} m_A}{m_T}$$

wherein the actual absolute amplitude $A_{abs\ ist\ A}$ can be obtained from the dual integration of the acceleration of the drive unit 4.

The required value $A_{abs\ soll\ T}$ is stored in a suitable memory of the control 26 (FIG. 2) and can be input into the same by an operator or by a line control.

If the amplitude A abs ist T of the vibratory oscillation does not correspond to its required value A abs soil T, a correction is made in step 55, in that the control 26 (FIG. 2) activates the vibration drive 10 accordingly, for example in that it increases or decreases in steps the amplitude of the periodic voltage form applied to its coil, depending on whether the amplitude A abs ist T is to be increased or decreased. The step size is again determined in the actual case by the expert or alternatively can be input into a memory of the control 26 (FIG. 2) by an operator.

Since it is possible for a changed amplitude $A_{abs\ ist\ T}$ of the vibratory oscillation to change, for example, the filling of the feeder tray 6 (FIG. 2), the process after step 55 preferably jumps back to step 51 in order to recalculate the mass $m_{ist\ T}$ of the carrier arrangement 5. Since the recalculation in the computation shown above uses the carrier arrangement 5 as its basis, which for its part is changed by a changed filling of the feeder tray 6 (FIG. 2), the control 26 must, in order to execute step 51, retrieve the momentary resonance frequency $f_{res\ ist}$ from the first regulating cycle.

The result is a method, in which preferably the detected acceleration of the drive unit 4 is then used for regulating an amplitude A T of the vibratory movement of the carrier arrangement 5.

Further preferably, using the actual resonance frequency $f_{res\ ist}$ of the carrier arrangement 5, the actual mass m ist T thereof is determined and then from this a actual amplitude A abs ist T of its vibratory movement.

Finally, with the method according to the invention, a vibration drive 10 is especially preferably regulated such that a actual amplitude $A_{abs\ ist\ T}$ of the vibratory movement of the carrier arrangement 5 lies within the range of a predetermined value $A_{abs\ soll\ T}$ or is brought back to the same.

The control 26 is preferably further configured, using the acceleration signal of the drive unit 4, to generate a regulating variable for the vibration drive 10, such that the actual amplitude of the carrier arrangement 5 lies within the range of a predetermined value or is brought back to the same.

Finally the control 26 is further configured to determine the actual mass $m_{ist\ T}$ of the carrier arrangement 5 and with this the actual absolute amplitude $A_{abs\ ist\ T}$ of the vibratory movement from the resonance frequency $f_{res}$ of the carrier arrangement 5 and the spring constant c of the spring-elastically formed drive levers supporting the carrier arrangement 5, and thereupon to generate a regulating variable for the vibration drive 10 such that the amplitude $A_{abs\ ist\ T}$ reaches the range of a predetermined value or is brought back to the same.

The invention claimed is:

1. A method for regulating the vibratory movement of a vibration feeder, wherein in operation the acceleration of a drive unit of the vibration feeder is continuously detected with a regulating variable being generated therefrom for a vibration drive such that a carrier arrangement of the vibration feeder vibrates closer to its resonance frequency or is brought back again towards the same.

2. The method according to claim 1, wherein the detected acceleration of the drive unit is further used for regulating an amplitude of the vibratory movement of the carrier arrangement.

3. The method according to claim 1, wherein the vibration of the drive unit is determined from the detected acceleration and a drive frequency of the vibration drive is changed in direction of a resonance frequency of the carrier arrangement, until a drive oscillation of the vibration drive and a vibration oscillation of the carrier arrangement have a phase shift, which leads to a resonance stimulation of the carrier arrangement.

4. The method according to claim 1, wherein using the actual resonance frequency of the carrier arrangement, the actual mass thereof and from this in turn an actual amplitude of its vibratory movement is determined.

5. The method according to claim 4, wherein the vibration drive is regulated such that an actual amplitude of the vibratory movement of the carrier arrangement lies within the range of a predetermined value or is brought back again to the same.

6. A vibration feeder for performing the method according to claim 1, with a drive unit comprising a vibration drive, a carrier arrangement comprising a feeding element for material to be conveyed and with a control for the vibration drive, wherein an acceleration sensor is arranged on the drive unit, which, when the vibration feeder is in operation, detects the actual acceleration of the drive unit, and the control is configured, with the aid of an actual acceleration signal of the acceleration sensor, to generate a regulating variable for the vibration drive such that the carrier arrangement vibrates essentially within its resonance frequency.

7. The vibration feeder according to claim 1, wherein the control is arranged in the drive unit and the acceleration sensor in turn is arranged on the control.

8. The vibration feeder according to claim 6, wherein the vibration drive comprises an encapsulated coil, and the control as well as the acceleration sensor are arranged within the encapsulation.

9. The vibration feeder according to claim 6, wherein the drive unit comprises spring-elastically configured drive levers for the carrier arrangement, via which this is mounted on the drive unit.

10. The vibration feeder according to claim 9, wherein the drive levers are configured as leaf springs.

11. The vibration feeder according to claim 6, wherein the control is further configured, using the acceleration signal of the drive unit, to generate a regulating variable for the vibration drive such that the actual amplitude of the carrier arrangement lies within the range of a predetermined value or is brought back to the same.

12. The vibration feeder according to claim 6, wherein the control is further configured, using the resonance frequency of the carrier arrangement and the spring constant of drive levers resiliently configured and supporting the carrier arrangement, to determine the actual mass of the carrier arrangement and thus the actual amplitude of the vibratory movement and thereupon for generating a regulating variable for the vibration drive such that this reaches the range of a predetermined value or is brought back again to the same.

* * * * *